United States Patent Office 3,809,771
Patented May 7, 1974

3,809,771
PROCESS FOR OBTAINING FULL-FAT
OILSEED-PROTEIN BEVERAGES
Gus C. Mustakas, Peoria, Ill., assignor to the United States of America as represented by the Secretary of Agriculture
No Drawing. Filed Aug. 8, 1972, Ser. No. 278,845
Int. Cl. A23l 1/20
U.S. Cl. 426—364                                                              7 Claims

ABSTRACT OF THE DISCLOSURE

A full fat oilseed beverage is prepared by suspending full-fat oilseed flour in water, inactivating the lipoxygenase, precipitating the lipid-protein, resuspending the precipitate in water at pH of about 9, heating and cooling the suspension, adjusting the pH to about 7 and clarifying.

---

A nonexclusive, irrevocable, royalty-free license in the invention herein described, throughout the world for all purposes of the United States Government, with the power to grant sub-licenses for such purposes, is hereby granted to the Government of the United States of America.

BACKGROUND OF THE INVENTION

This invention relates to a method of obtaining a full-fat protein isolate from oilseeds. More specifically, it relates to the production of oilseed milk beverages.

Special edible protein products have been prepared from a variety of oilseeds, such as peanut, sesame, safflower, cottonseed, and sunflower seeds. However, most activity in this area has been with soybeans. Protein beverages based on soybean milk have been tested and found acceptable in several countries, and a continuing effort is being made to improve these products. Production methods have been developed that yield full-fat soy flour with good nutritional, flavor, and keeping qualities [Mustakas et al., Food Technol. 24: 1290 (1970)]. A new process for using extruded full-fat soy flours in the preparation of a low-cost spray-dried infant beverage that can be reconstituted with water has also been developed (U.S. Pat. 3,639,129).

Traditionally, soybean milk has been made by the water extraction method, the original procedure used in China for several centuries [U.S. Department of Agriculture, Soybean milk, ARS, CA–N–13 (January 1961)]. Protein and oil are extracted in about the same ratio as they occur in the beans and are in the form of an emulsion. The oligosaccharide carbohydrate fraction of soybeans which has been reported to be responsible for flatulence [Steggerda et al., Proc. Soc. Expt. Biol. Med. 121. 1235 (1966)] remains in the soybean milk by this process. To circumvent this problem, alternate methods have used water-soluble protein isolates prepared from defatted soy products by isoelectric precipitation (USDA, supra; and D. W. Johnson, United Nations Industrial Development Organization, Document ID/WG 45–6, November 1969). These methods start with protein isolate powders and make an emulsion by adding emulsifiers, fats, minerals, and sugars. Since these nonfat protein isolates are obtained in rather low yields (about 25% to 50% of the total protein, Johnson, supra) they are relatively more expensive than other soy fractions. However, the isolate route permits better control of the composition and concentration of the milk; also, the milk has a bland flavor as compared to the whole bean extract.

The object of this invention is the provision of full-fat oilseed-protein beverages having greatly improved characteristics. More specifically, the object is the provision of a high-protein milk-like product having the properties of bland flavor, oxidative stability, nonflatulence, good suspension, and good mouthfeel.

A further object of the invention is the provision of defatted protein isolates in remarkably high yields.

In accordance with the object of the invention, I have discovered a method of producing full-fat oilseed-protein beverages comprising the following steps:

a. suspending full-fat oilseed flour in from eight to 10 times its own weight of water, which has been adjusted to a temperature of from about 150° to 212° F. and a pH of from about 3.5 to 4.5, for a time sufficient to inactivate lipoxygenase enzyme present in the full-fat oilseed flour;

b. cooling the suspension to and holding at a temperature of from about 50° to 75° F. for a time sufficient to precipitate lipid-protein present in the full-fat oilseed flour;

c. separating the precipitated lipid-protein from the resulting liquid whey;

d. resuspending the precipitated lipid-protein in water at a pH of about 9, the amount of the water equaling from about seven to about 10 times the weight of the oilseed flour of step (a);

e. heating the suspension of step (d) at from about 205° to 212° F. for from about 1 to about 5 minutes;

f. cooling the suspension of step (e) to about 70° to 75° F. and adjusting the pH to about 7; and g. clarifying the cooled and neutralized suspension to form a full-fat oilseed-protein beverage.

I have also discovered a method for producing defatted protein isolates in high yields comprising essentially the steps (a) through (f) described above for producing full-fat oilseed-protein beverages, and the additional steps of removing the water and extracting the fat with a suitable solvent from the neutralized suspension described in step (f) above.

DETAILED DESCRIPTION OF THE INVENTION

Full-fat oilseed flours useful as starting materials in the claimed process include any whole, dehulled, full-fat oilseed product, either raw or cooked, and having nitrogen solubility index (NSI) values in water ranging from about 15 to 98%. This includes products from soybean, peanut, cotton, rape, sesame, sunflower, and safflower seeds. Preferably these starting materials are ground to flours having mesh sizes such that 95 to 100% will pass a 100-mesh screen. However, oilseed products having greater mesh sizes, including flakes, will result in acceptable milks with somewhat reduced lipid-protein yields and will be considered equivalent for the purposes of the invention. Soybeans are considered representative of the above-mentioned oilseeds and are used for the purpose of the invention as the preferred oilseeds from which to prepare the full-fat flour starting material. Other oilseeds can be treated in a manner similar to that described herein for soybeans with modification of the claimed invention which will be well within the knowledge of those skilled in the art.

To obtain a soybean product having optimum nutritional value and consumer acceptability, it is preferred that the starting material be prepared in the following manner: crack and dehull whole raw soybeans, lightly cook the dehulled cracked beans in dry heat at about 150° F. for about 5 minutes, flake and pin mill to a mesh size such that 95 to 100% of the product will pass a 100-mesh screen.

The object of step (a) of the instant process is to impart to the final product a superior flavor and shelf stability by deactivating the lipoxygenase enzymes that catalyze oxidation of fats, thereby causing rancidity. Enzymes were inactivated in less than 1 minute when soyflours were slurried in boiling water at a pH of 7. Complete deactivation also occurs within about 10 minutes when the starting materials were slurried in water which had been previously adjusted to pH 3.5 to 4.5 and temperatures of 150° to 212° F. It is preferred that the amount of water be from eight to 10 times the amount of soyflour (by weight), that the temperature be about 205° to 210° F., and that the pH be about 3.5 before adding the soyflour, because these parameters are somewhat more compatible to those of the second step and yields of precipitated protein are somewhat larger than those obtained using other parameters. Products obtained using these preferred parameters also have a more bland flavor.

Lipid-protein precipitations were carried out by modifications of the acid washing and the isolated defatted soy protein processes generally described by Johnson, supra. A comparison of the two methods was made. In the acid wash technique, soyflour was stirred into water at a pH of about 4.5 and the mixture allowed to stand for 20 minutes. The pH rose to about 6. The mixture was then centrifuged and washed twice with water at pH 4.5 to separate the lipid-protein curd from the liquid whey fraction. Lipid-protein curd was resuspended in water, homogenized, cooked at 160° for 5 minutes, and cooled.

The isolated soy protein process was accomplished by suspending full-fat soy flakes in water at a pH of 4.5 and allowed to stand for 20 minutes while the pH was maintained at pH 4.5 with additions of $H_3PO_4$. Lipid-protein curd was separated from the whey by centrifugation, washed twice with water at pH 4.5, and resuspended in water. The suspension was adjusted to pH 7, and homogenized.

The milk fractions resulting from the two methods above were analyzed for recoveries, and distribution of solids, protein, and fat, Table 1.

TABLE 1

| Process | Distribution between milk and whey fractions | | | | | |
|---|---|---|---|---|---|---|
| | Solids, percent in— | | Protein, percent in— | | Fat, percent in— | |
| | Milk | Whey | Milk | Whey | Milk | Whey |
| Acid wash | 66 | 34 | 75 | 25 | 73 | 27 |
| Isolated soy protein | 77 | 23 | 90 | 10 | 91 | 9 |

Since the distributions of protein and fat in the isolate process were considerably better than in the acid wash process, the isolate procedure is preferred. In the method as defined by the claims, it is preferred that lipoxygenase enzyme deactivation and lipid-protein precipitation be carried out in one step by dispersing soyflour in water at a temperature of 206° to 212° F. at a pH which has been adjusted and maintained at 3.5 by dilute sulfuric acid. Any mineral acid is operative for this part of the procedure, but others may require slightly different pH values to accomplish maximum precipitation. However, at pH values of 4 or over, there is a tendency to form soluble proteinates that are lost in the whey fraction. A 5- to 10-minute holding period at the high temperature is sufficient to inactivate the enzyme. The preferred time and temperature parameters also have some effect on the protein and fat such that increased yields are obtained. At the end of the holding time, the mixture is cooled to 50° to 75° F. and stirred for 10 to 20 minutes to assure maximum precipitation of the lipid-protein curd. This acid water cook accomplishes another very important object; that is, the reduction of flatulent properties by solubilizing carbohydrates which are removed in the whey fraction.

Separation of lipid-protein curd from the liquid whey fraction can be accomplished by any suitable method such as filtration or centrifugation. Centrifugation is preferred because of its efficiency and shorter operation times. It is also more compatible with continuous or semicontinuous operations. Using a pilot-plant size perforated basket centrifuge covered with duck cloth, it was found that the preferred speeds were between 3600 and 3800 r.p.m. However, other equipment will have optimum running conditions which will be obvious to anyone skilled in the art. The centrifuge cake (i.e., the lipid-protein curd) was washed two or more times with tap water or water at the same pH at which the curd was precipitated. In an alternate method the cake was resuspended in 50% w./w. aqueous ethyl or isopropyl alcohol followed by centrifugation and washing from two to three times with aqueous alcohol and/or water. Washing the cake with aqueous alcohols resulted in products having more bland flavors. The washed cake was resuspended in tap water preferably in amounts of from seven to 10 times the original amount of starting material.

When defatted protein isolates were the desired products, the preferred amounts of resuspension water were from three to five times the original amount of starting material.

The next step is for the purpose of inactivating trypsin inhibitor which, when present in the final product, reduces the nutritional value of the protein. Inactivation of this enzyme proceeds very slowly under acidic conditions. Therefore, the acid cook in the first step (lipoxygenase deactivation) did not accomplish the inactivation of trypsin inhibitor. I have discovered that under alkaline conditions, trypsin inhibitor is deactivated very rapidly. In the example, 100% deactivation was obtained by adjusting the pH of the suspension to 9 with $NH_4OH$ and heating quickly with sparge steam to a temperature of about 205° to 212° F. and holding for 1 minute. It is preferred that the suspension be quickly cooled to about room temperature. High-temperature short-time (HTST) plate exchangers can be used to further reduce heating times. The advantages of short cooking times in this step are (1) reduced viscosity of the soy milk product (i.e., as low as 6.5 cp.; cow's milk has a viscosity of 4.2 cp.); (2) less heat-polymerized curd clinging to the walls of the vessel, thereby reducing protein yield; (3) a more stable emulsion; and (4) reduced losses of curd in the final clarification step. The pH of the suspension should be maintained at at least about pH 9 because at pH 8 an inactivation of only about 60% was obtained.

After this alkaline cook step, it is preferred that the suspension be subjected to colloid milling and homogenization, which were accomplished in a colloid mill having maximum plate clearances of about 0.001 inch, and in a high-pressure homogenizer under pressure of from 8 to 10,000 p.s.i. Low-pressure homogenizers such as the Manton-Gaulin two-stage homogenizer are also suitable. The use of these optional steps decreased the amount of solids removed from the soy milk in the clarification step.

When milling and homogenization were not used, the products had poorer mouth-feel and developed some sedimentation upon standing.

After the HTST alkaline cooking step, or after colloid milling-homogenization when they are used, the pH of the suspension is reduced to a pH of about 7 with a mineral acid. This completely removes the alkaline flavor present at the higher pH.

The final step is a clarification process best carried out in a centrifuge as described for separation of the lipid-protein curd. This removes any agglomerated particles that have resisted complete dispersion, leaving a highly stable, bland, nonflatulent soy milk product having a mouthfeel of essentially the same quality as cow's milk.

In the production of defatted protein isolates it is preferred that the suspension not be subjected to colloid milling, homogenization, or the final centrifugation step. After the HTST cooked suspension is cooled to a temperature of from 70° to 100° F. and the pH is adjusted to about 7, the fat is removed by liquid-liquid extraction using a suitable water-immiscible solvent (e.g., pentane, hexane), and the defatted product dried. However, alternatively the water is first removed by means such as evaporation, spray drying, or freeze drying and the fat removed from the dried product by solvent extraction. In this manner defatted protein isolate products were obtained in total yields of up to 95% of the original protein. Other methods of fat removal will be known to those skilled in the art and will be considered to be within the scope of this invention. By using a gas-liquid chromatographic (GLC) procedure (see Example 1, infra), it was found that the hexane defatted isolates contained small amounts of bound lipids (fats). Three commercial soy-protein isolates analyzed in the same manner as the instant products contained 1% to 2% bound lipids, while the instant products contained from 4% to 5%. However, products containing as high as about 90% protein can be obtained essentially fat-free by extracting the full-fat products with polar solvents such as aqueous alcohols.

The final beverage products of the instant invention are suitable for further processing such as spray drying to obtain dried reconstitutable soy milk powders as food supplements. Additives such as fats, vitamins, minerals, and flavorings can also be used to make beverages suitable to any taste and nutritional need. When extra fat is added, it is preferred that it be added to the suspension as it is being fed to the colloid mill.

The following examples are intended only to further illustrate the invention and should not be construed as limiting the scope of the claims.

EXAMPLE 1

A. Preparation of raw preheated full-fat soyflour.— Field-dried soybeans were subjected to a single break (one pass) cracking on corrugated rolls (10 cor./inch, 0.040-inch clearance). The cracked meats were then passed over a two-deck screen shaker (⅛-inch round hole top screen and a No. 14 bottom screen) with dehulling aspiration on the meats as they entered the top screen and on the No. 14 screen tailings. The dehulled meats were then dry heat-treated by passing through a screw paddle conveyor maintained at 150° by jacketed steam and having an overall retention time of about 5 minutes. The hot meats were passed through flaking rolls, cooled, and ground (99% through 100-mesh screen) in a wide-chamber air-swept pin or stud mill. The resulting flour had an NSI value of 97.

B. Preparation of soy milk.—Soyflour (500 g.), prepared as described in (A) above (39.5% protein, 22.0% fat, 4.8% moisture, all by weight), was slurried in 4000 cc. of tap water that had previously been adusted to pH 3.5 with 10% sulfuric acid, heated with sparge steam to 206° to 210° F., held at that temperature and stirred for 10 minutes, cooled to room temperature (70° to 75° F.), and stirred for 15 minutes. The slurry was maintained at pH 3.5 with additions of 10% sulfuric acid. The slurry was then fed over a 5- to 10-minute period to the bowl of a perforated basket centrifuge running at 3800 r.p.m. (1500 $\times$g.). The perforated basket was covered with a cotton duck cloth. The resulting cake (lipid-protein curd) was washed two times with 500-ml. portions of tap water, pH 7, spun dry for 5 minutes. The liquid whey was recycled through the centrifuge and the recovered curd combined with the cake. The wet curd (i.e., cake) was reslurried in 4000 cc. of tap water and the suspension adjusted to pH 9 with 10% $NH_4OH$ solution. The alkaline suspension was quickly (2 to 3 minutes) heated to about 205° F. using open sparge steam, held at 205° F. for 1 minute, and quickly (2 to 3 minutes) cooled to room temperature (70° to 75° F.). The alkaline-cooked suspension was fed to a Manton-Gaulin colloid mill having a plate clearance of 0.001 inch, then to a Manton-Gaulin single-stage homogenizer at 8000 to 10,000 p.s.i.g. The milk was adjusted to pH 7.2 with 10% $H_2SO_4$ and centrifuged. The small amounts of cake obtained at this stage can be recycled to the soyflour starting material at least five times with no detrimental effect on the finished product.

The final milk product was analyzed as described below and the results tabulated in Table 2.

Methods of analysis.—Solids content of the milk samples was determined by the official method of the AOAC [Association of Official Agricultural Chemists, Methods of Analysis, 9th Edition, Washington, D.C. (1960)]. Protein, fat, ash, crude fiber, and moisture were run on the freeze-dried milk and whey samples and nitrogen-free extract calculated by subtracting the total from 100% [American Association of Cereal Chemists, AACC, Cereal Laboratory Methods, 7th edition, The Association, St. Paul, Minnesota (1962)]. Urease activity was run on freeze-dried milk samples that were defatted and then determined by the AACC method.

NSI for the measurement of water-soluble protein was measured on the defatted spray dried milk samples or defatted whole soybean flours by a modified method (pH 7.2) of Smith et al., Cereal Chem. 43(2): 261 (1966).

Degree of lipoxygenase inactivation was run on spray dried defatted milk solids by a modification of the method of Smith, Arch. Biochem. Biophys. 19: 133 (1948).

Trypsin inhibitor (TI) activity was determined on the freeze-dried and defatted milk samples by a gelatin digestion procedure in which trypsin is added to a buffer solution of gelatin in the presence of TI. The reaction is stopped with neutral formaldehyde solution and the free carboxyl groups are titrated with 0.1 N sodium hydroxide solution.

Available lysine was determined on defatted products according to the description by Rao et al., Anal. Chem. 35: 1927 (1963).

Viscosities of soy milks were measured with a Brookfield Model LVT viscometer using a No. 1 spindle at 60 r.p.m.

Free lipids were determined on the freeze-dried samples by pentane-hexane extraction (AACC, supra); bound lipids were run on the pentane-hexane extraction residue by the GLC method of L. T. Black et al., Cereal Chem. 44: 152–160 (1967).

TABLE 2

| Analysis | Example | | | | | | |
|---|---|---|---|---|---|---|---|
| | 1 | 2 | 3 | 4 | 5 | 6 | 7 |
| Solids, percent recovered in— | | | | | | | |
| Milk [1] | 69.9 | 71.7 | 61.7 | 58.8 | 57.5 | 61.1 | 74.8 |
| Whey [2] | 22.0 | 28.4 | 27.4 | 30.6 | 30.2 | 24.8 | 25.1 |
| Cake [1] | 8.6 | 2.7 | 7.1 | 10.9 | 6.1 | 15.7 | 7.3 |
| Protein, percent recovered in— | | | | | | | |
| Milk [1] | 95.2 | 90.6 | 92.6 | 84.0 | 86.5 | 92.1 | 93.3 |
| Whey [2] | 8.1 | 9.3 | 10.1 | 17.7 | 18.7 | 10.1 | 14.7 |
| Cake [1] | 3.5 | 1.5 | 5.1 | 5.6 | 1.5 | 11.6 | 4.6 |
| Fat, percent recovered in— | | | | | | | |
| Milk [1][4] | 83.0 | 71.6 | 69.1 | 66.5 | 69.6 | 65.5 | 92.4 |
| Whey [2] | 3.1 | 26.0 | 13.2 | 31.0 | 15.0 | 17.6 | 9.4 |
| Cake [1] | 0.9 | 0.3 | 0.9 | 1.0 | 1.0 | 8.9 | 1.9 |
| Milk: [1] | | | | | | | |
| Composition, percent: | | | | | | | |
| Solid | 6.0 | 6.8 | 5.6 | 4.9 | 5.9 | 6.0 | 8.9 |
| Protein | 3.4 | 3.6 | 3.5 | 2.9 | 3.7 | 3.7 | 3.9 |
| Fat | 1.8 | 1.6 | 1.5 | 1.3 | 1.7 | 1.5 | 4.1 |
| Viscosity, cp | 7.1 | 18.0 | 8.2 | 6.5 | 12.5 | 8.6 | 9.2 |
| Lipox., percent deact | 100 | 100 | 100 | 99.7 | 99.6 | | 100 |
| TI, percent deact | 100 | 100 | 100 | 100 | 100 | | 100 |
| Available lysine, percent [3] | 6.6 | 6.5 | 6.7 | 6.3 | 6.6 | | 6.4 |
| Urease activity | 0 | 0 | 0 | 0 | 0 | | 0 |
| Whey: | | | | | | | |
| Composition, percent: | | | | | | | |
| Solid | 2.3 | 2.2 | 2.6 | 3.1 | 3.3 | 2.9 | 2.1 |
| Protein | 0.4 | 0.6 | 0.4 | 0.7 | 0.8 | 0.5 | 0.5 |
| Fat | 0.1 | 0.5 | 0.3 | 0.6 | 0.4 | 0.5 | 0.3 |
| Freeze-dried milk: | | | | | | | |
| Composition, percent: | | | | | | | |
| Protein | 56.4 | 53.5 | 62.5 | 59.3 | 56.7 | 59.6 | 44.3 |
| Fat [4] | 28.1 | 23.8 | 26.8 | 27.0 | 28.9 | 25.6 | 46.0 |
| Ash | 3.2 | 3.6 | 3.1 | 3.1 | 1.8 | 3.0 | 2.2 |
| Crude fiber | 0.1 | 2.5 | 0.7 | 0.3 | 1.8 | 0.3 | 1.3 |
| Moisture | 7.5 | 0 | 2.9 | 6.1 | 2.9 | 3.2 | 2.4 |
| NFE | 4.7 | 16.6 | 4.0 | 4.2 | 7.9 | 8.3 | 3.8 |
| Isolated protein [5] | 87.6 | 70.2 | 88.9 | 88.6 | 83.1 | 83.7 | 85.6 |

[1] Products of clarification centrifugation.
[2] Product of separation centrifugation.
[3] Percent of total protein.
[4] Total lipids—includes free plus bound forms.
[5] Moisture-free, fat-free basis.

EXAMPLES 2–7

Soy milks prepared by the methods described in Example 1 with the following exceptions:

Example 2—a. The soyflour starting material was slurried in 5000 cc. tap water, pH 3.5.
b. The alkaline suspension pH 9 was held at 206°–210° F. for 5 minutes, then colloid milled and homogenized without cooling.

Example 3—a. The starting material was commercially prepared full-fat soyflour (Nutrisoy 220, Archer Daniels Midland Co.) having approximately the same amounts of protein, fat, and moisture as the flour described in Example 1 and an NSI value of 18.
b. The centrifuged cake (lipid-protein curd) was washed two times with tap water adjusted to pH 3.5.
c. The alkaline-cooked suspension was colloid milled and homogenized without cooling and was cooled to room temperature after the homogenization step.

Example 4—The starting material was extruded full-fat soyflour prepared by the method of Mustakas et al., supra, having an NSI value of 16.3. The amounts of protein, fat, and moisture were approximately the same as the flour described in Example 1.

Example 5—a. The starting material was a raw full-fat soyflour prepared in a manner similar to that described in Example 1a without the dry heat treatment and having an NSI value of about 97. The amounts of protein, fat, and moisture were approximately the same as the flour described in Example 1.
b. In the alkaline cook step the suspension was held at a temperature of 205° F. for 5 minutes.

Example 6—The colloid milling and homogenization steps were eliminated, and the suspension was cooled, pH adjusted and centrifuged immediately after the 1-minute alkaline cook.

Example 7—The spun-dried lipid-protein curd (plus the cake from the recycled whey) was resuspended in only 3500 cc. of tap water, the suspension adjusted to pH 9, cooked 1 minute, and cooled to 150° F. Hydrogenated soybean oil (100 g., Spry Shortening, Procter & Gamble Co., Cincinnati. Ohio) was added to the suspension as it was being fed to the colloid mill. The milled suspension was then adjusted to pH 7.2, homogenized, and centrifuged.

The soy milk products of Examples 2 through 7 were analyzed as described in Example 1 and the results tabulated in Table 2.

EXAMPLE 8

A soy milk product was prepared as described in Example 6, freeze dried, and extracted with pentane-hexane as described in Example 1. The defatted product was then analyzed, along with three commercial soy protein isolate products, for free fat, bound fat, and protein, Table 3.

TABLE 3

| | Percent | | |
|---|---|---|---|
| Protein isolate | Free fat | Bound fat | Protein [1] |
| Example 8 | 0.4 | 2.3 | 89.4 |
| Commercial: | | | |
| A | 0.1 | 1.9 | 93.1 |
| B | 0.1 | 1.3 | 96.0 |
| C | 0.1 | 0.8 | 94.5 |

[1] Moisture-free, fat-free basis.

I claim:
1. A method of producing full-fat oilseed-protein beverages comprising the following steps:
 a. suspending full-fat oilseed flour in from eight to 10 times its own weight of water, which has been adjusted to a temperature of from about 150° to 212° F. and a pH of from about 3.5 to about 4.5, for a time sufficient to inactivate lipoxygenase enzyme present in the full-fat oilseed flour;
 b. cooling the suspension to and holding at a temperature of from about 50° to 75° F. for a time sufficient to precipitate lipid-protein present in the full-fat oilseed flour;
 c. separating the precipitated lipid-protein from the resulting liquid whey;
 d. resuspending the precipitated lipid-protein in water at a pH of about 9, the amount of said water equaling from about seven to 10 times the weight of the oilseed flour of step (a);

e. heating the suspension of step (d) to from about 205° to 212° F. for from about 1 to 5 minutes;
f. cooling the suspension of step (e) to about 70° to 75° F. and adjusting the pH to about 7; and
g. clarifying the cooled and neutralized suspension to form a full-fat oilseed-protein beverage.

2. A method of producing full-fat oilseed-protein beverages as described in claim 1 in which the full-fat oilseed flour is full-fat soyflour.

3. A method of producing full-fat oilseed-protein beverages as described in claim 1 in which the suspension of step (a) is maintained at a pH of about 3.5 while held at a temperature of from about 205° to about 212° F. for from 5 to 15 minutes and cooled in step (b) to and held at a temperature of about 50° to 75° for about 10 to 60 minutes.

4. A method of producing full-fat oilseed-protein beverages described in claim 1 in which the suspension of step (e) is further processed by subjecting said suspension to a colloid mill having a maximum plate clearance of about 0.001 inch followed by homogenization under pressure of from about 3000 to 10,000 p.s.i.

5. A method of producing full-fat oilseed-protein beverages as described in claim 1 in which the soyflour is prepared by the method comprising the following steps:
   a. cracking whole raw soybeans;
   b. dehulling the cracked beans;
   c. cooking the dehulled cracked beans in dry heat at about 150° for about 5 minutes;
   d. flaking the cooked dehulled cracked beans; and
   e. pin milling the flakes so that 95 to 100% of the milled product will pass 100-mesh screens.

6. A method of producing full-fat oilseed-protein beverages comprising the following steps:
   a. suspending full-fat oilseed flour in from eight to 10 times its own weight of water, which has been adjusted to a temperature of from about 150° to 212° F., for a time sufficient to inactivate lipoxygenase enzyme present in the full-fat oilseed flour;
   b. cooling the suspension to a temperature of about 50° to 75° F. and adjusting the pH to a pH of about 3.5 to 4.5 while holding the temperature at about 50° to 75° F. for a time sufficient to precipitate lipid-protein present in the full-fat oilseed flour;
   c. separating the precipitated lipid-protein from the resulting liquid whey;
   d. resuspending the precipitated lipid-protein in water at a pH of about 9, the amount of said water equaling from about seven to 10 times the weight of the oilseed flour of step (a);
   e. heating the suspension of step (d) to from about 205° to 212° F. for from about 1 to 5 minutes;
   f. cooling the suspension of step (e) to about 70° to 75° F. and adjusting the pH to about 7; and
   g. clarifying the cooled and neutralized suspension to form a full-fat oilseed-protein beverage.

7. A method of producing full-fat oilseed-protein beverages as described in claim 1 in which hydrogenated soybean oil is added to the resuspended lipid-protein in step (d), the amounts of water and hydrogenated soybean oil being equal to seven times and two tenths times the weight of soyflour in step (a), respectively.

References Cited
FOREIGN PATENTS
95 1970 Japan.
1,935,400 1970 Germany.

OTHER REFERENCES
Wilkens et al., Food Technology, vol. 21 (December 1967). pp. 1630–1633.

Hand et al., Food Technology, December 1964, pp. 1963–1966.

Smith et al., Chemical and Engineering News, vol 24, No. 1 (Jan. 10, 1946), pp. 54–56.

JOSEPH M. GOLIAN, Primary Examiner

U.S. Cl. X.R.

426—365, 442, 431